Oct. 3, 1933.     J. H. ZESEWITZ     1,929,342
STEERING MECHANISM FOR AUTOMOTIVE VEHICLES
Filed July 9, 1932     5 Sheets-Sheet 3
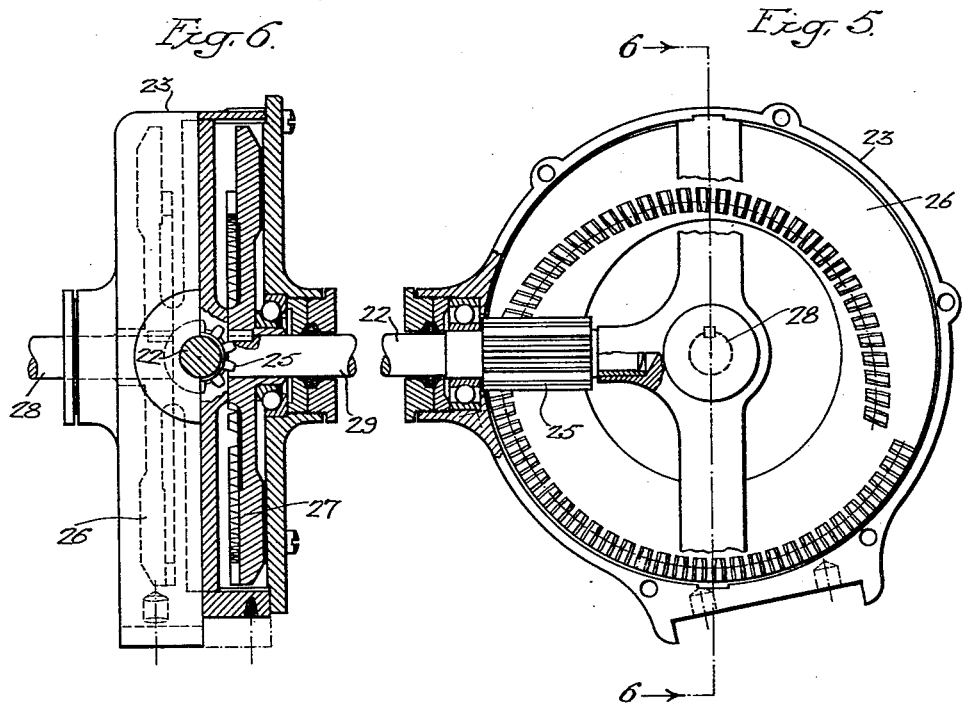
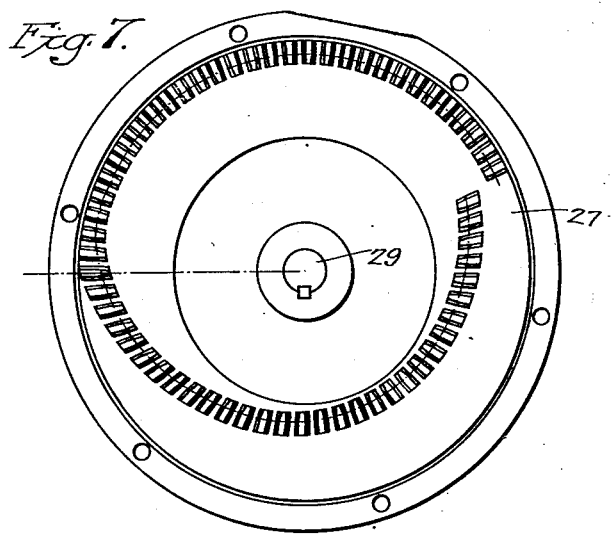
INVENTOR:
John H. Zesewitz
By Howson & Howson,
Attorneys.

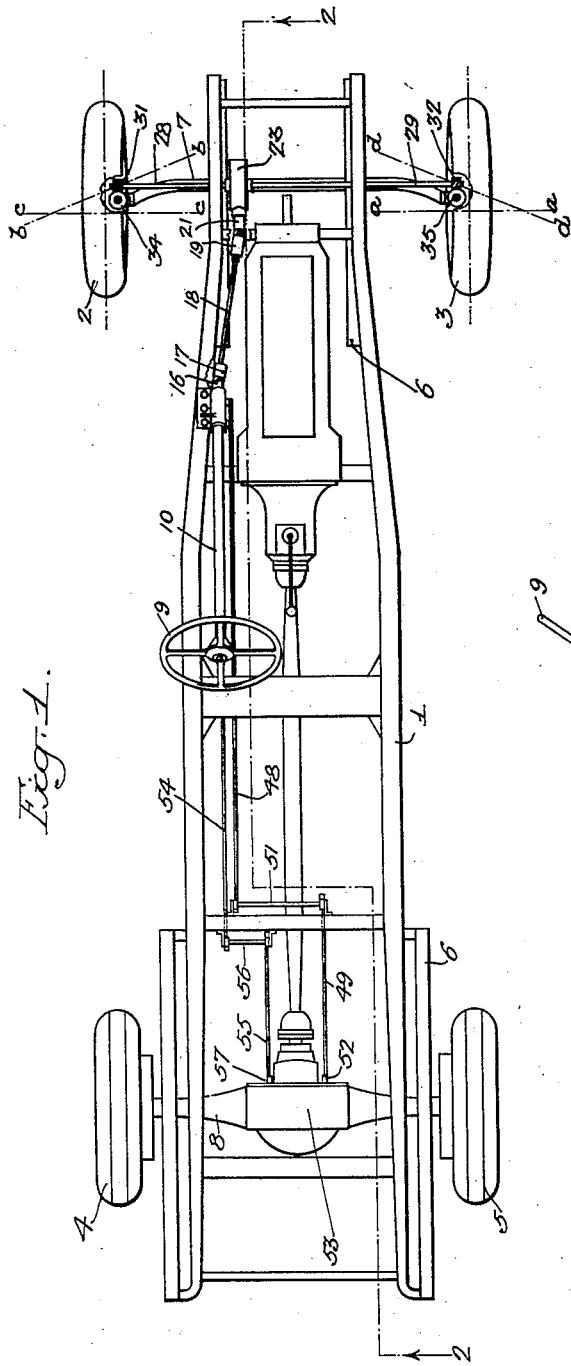

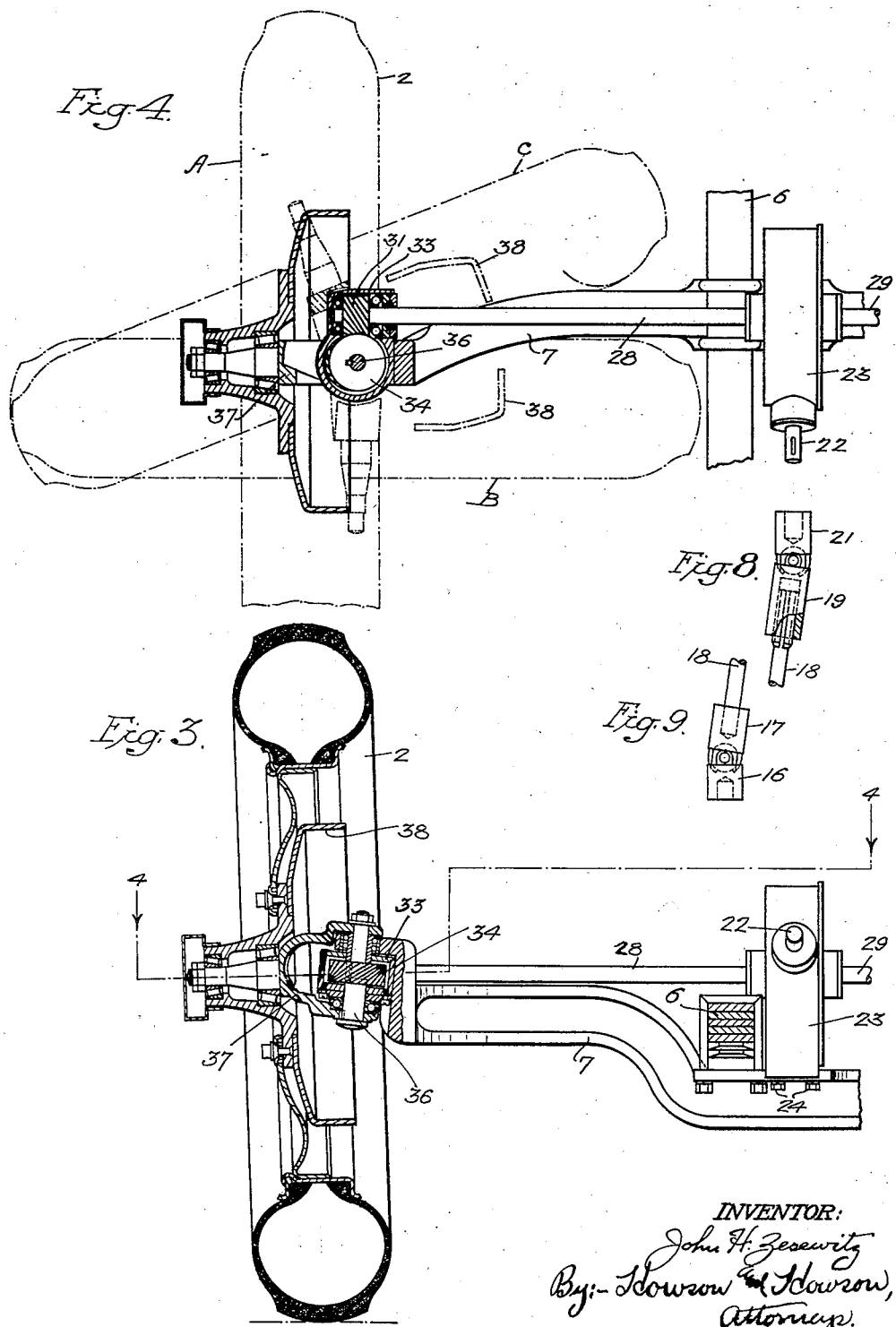

Oct. 3, 1933.   J. H. ZESEWITZ   1,929,342
STEERING MECHANISM FOR AUTOMOTIVE VEHICLES
Filed July 9, 1932   5 Sheets-Sheet 4
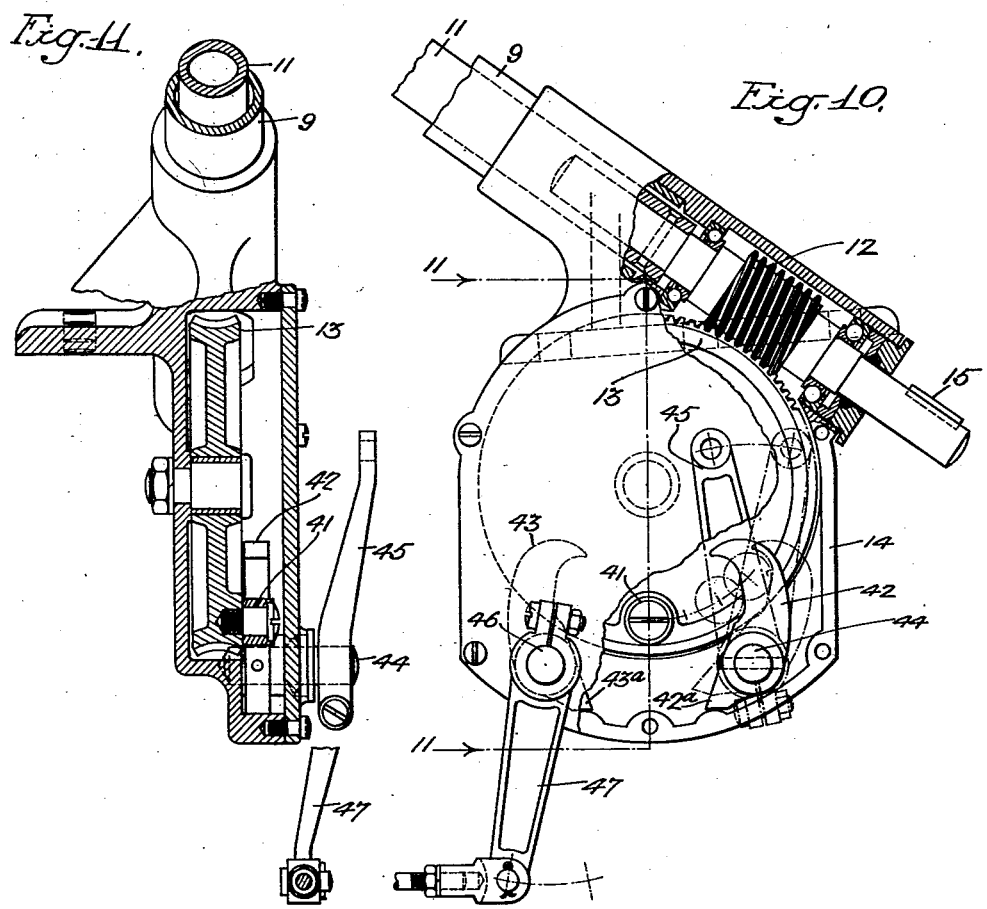
INVENTOR:
John H. Zesewitz
By Howson and Howson,
Attorneys.

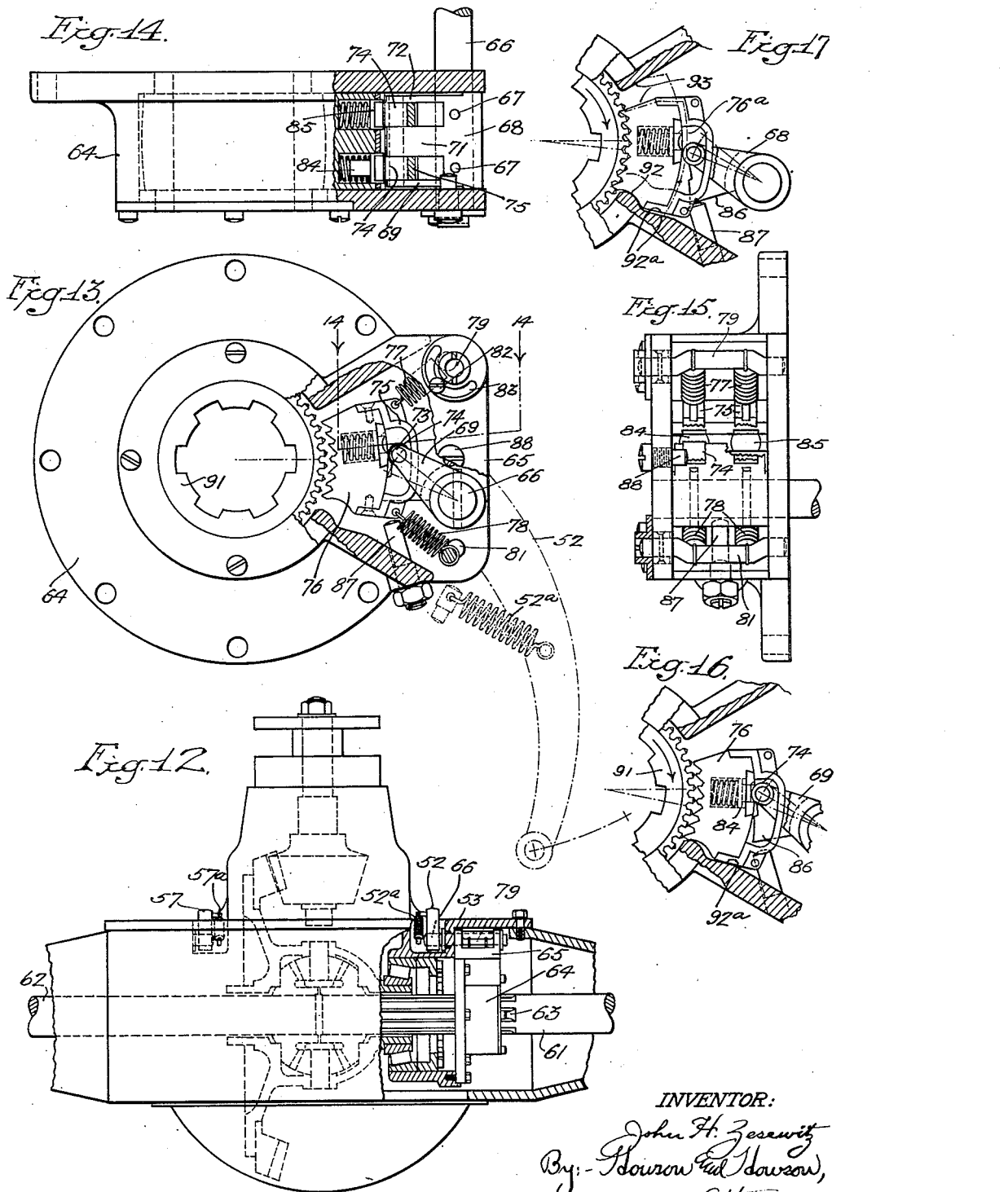

Patented Oct. 3, 1933

1,929,342

UNITED STATES PATENT OFFICE 1,929,342

STEERING MECHANISM FOR AUTOMOTIVE VEHICLES

John H. Zesewitz, Philadelphia, Pa.

Application July 9, 1932. Serial No. 621,671

9 Claims. (Cl. 280—96)

This invention relates to improvements in steering mechanism for automotive vehicles, and one object of the invention is to provide a novel and improved steering mechanism affording relatively great steering angles available for slow speed operation and for facilitating parking of the vehicle in congested districts.

Another object of the invention is to provide an improved steering mechanism affording approximately perfect steering conditions over the entire steering range.

A further and more specific object of the invention is to provide a novel steering mechanism making practicable 180° turns in narrow streets and driveways under substantially theoretically perfect steering conditions.

The invention further resides in the provision of novel and improved mechanism for actuating the steering wheels to effect the aforedescribed results; and in certain other structural and mechanical details hereinafter set forth and illustrated in the attached drawings, in which:

Figure 1 is a plan view of the chassis of a motor vehicle equipped with a steering mechanism made in accordance with my invention;

Fig. 2 is a longitudinal sectional view on the line 2—2, Fig. 1;

Fig. 3 is a vertical sectional view through the left front wheel of the vehicle showing a portion of the front axle;

Fig. 4 is a fragmentary sectional view on the line 4—4, Fig. 3;

Fig. 5 is an enlarged fragmentary view of a portion of the mechanism shown at the right-hand end of Fig. 2;

Fig. 6 is a partial section on the line 6—6, Fig. 5;

Fig. 7 is a face view of an element of the mechanism shown in Fig. 6;

Figs. 8 and 9 are fragmentary views illustrating details of the connecting devices between the steering column and the mechanism shown in Figs. 5, 6 and 7;

Fig. 10 is a side elevational partial sectional view of that portion of the mechanism shown in Figs. 1 and 2 at the base of the steering column;

Fig. 11 is a section on the line 11—11, Fig. 10;

Fig. 12 is a plan and partial sectional view illustrating the rear axle differential mechanism seen at the left-hand end of Figs. 1 and 2, together with one of the automatically actuated locking devices associated therewith;

Fig. 13 is an end and partial sectional view of the lock mechanism assembly shown at the right-hand end of Fig. 12;

Fig. 14 is a plan and partial sectional view on the line 14—14, Fig. 13, of the lock mechanism assembly;

Fig. 15 is an end elevational view of the mechanism shown in Fig. 13, and

Figs. 16 and 17 are fragmentary partial sectional views similar to that shown in Fig. 13 and illustrating the operation of the locking mechanism.

In Figs. 1 and 2 of the drawings, I have illustrated the chassis of a motor vehicle comprising the usual frame 1 supported upon wheels 2, 3, 4 and 5 through the medium of springs 6 interposed between the said frame 1 and the axles 7 and 8 on which the said wheels are journaled. The forward or steering wheels 2 and 3 are adjusted in the steering operation through the medium of a hand wheel 9 at the upper end of a column 10 within which is mounted for rotation a steering shaft 11, see Fig. 10. Adjacent its lower end the shaft 11 carries a worm 12 which meshes with a worm wheel 13 journaled in a housing 14 carried at the lower end of the steering column 10, the function of this worm mechanism being described hereinafter.

The shaft 11 projects through the lower end of the column 10 and has connected thereto one element 16, see Fig. 9, of a universal joint, the other element 17 of which is attached to an extension shaft 18. The other end of this extension shaft 18, as shown in Fig. 8, is splined into one element 19 of a second universal joint, the other element 21 of which is connected to the projecting end of a shaft 22, see Figs. 3, 4 and 5, which as shown is journaled in a housing 23 secured by bolts 24 to the axle 7. Within the housing 23, the shaft 22 carries a pinion 25 which at diametrically opposite sides meshes with a pair of face or crown wheels 26 and 27, which wheels, as shown in Fig. 6, are respectively keyed to transversely extending shafts 28 and 29 which extend from opposite sides of the housing 23 toward the respective wheels 2 and 3. The shafts 28 and 29 carry at their outer ends right and left-hand spiral drivers 31 and 32 respectively, see Figs. 1 and 4, these gears being journaled in housings 33 at the ends of the axle 7. Also occupying positions within the respective housings 33 are spiral followers 34 and 35 which mesh respectively with the spiral drivers 31 and 32. By so designing the respective spiral gear sets 31—34, and 32—35, that the spiral angle of the driver is much greater than the spiral angle of the follower it is possible to give the gear sets a degree of irreversibility which is desirable in connection with this steering mechanism. As shown in Fig. 3, each of the gears 34 and 35 is carried by or operatively connected with a pin 36 journaled in the end of the axle 7, to which pins 36 are also suitably secured the journal elements 37 of the respective forward wheels 2 and 3. It will be apparent from the foregoing description that rotation of the hand wheel 9 results, through the interconnecting mechanism, in a simultaneous adjustment of the forward wheels 2 and 3 of the vehicle for the steering operation.

An important feature of my invention resides in the extremely large angle of adjustability afforded the steering wheels. Thus with reference to Fig. 4, it will be noted that the left forward wheel 2 is adjustable in one direction from the normal straight ahead position designated "A" into a position approximately at right angles thereto and to the longitudinal axis of the motor vehicle, this position of the wheel 2 being indicated by the reference character "B". Also the wheel may be adjusted from the normal position designated "A" in the opposite direction, to the extreme position designated by the reference character "C". The entire adjustment shown embraces approximately 158°. This amount varies with different wheelbases of vehicles. In order to provide for this wide angle adjustment of the wheels without interfering materially with the standard wheel and brake construction, nor with the use of balloon tires, I offset the ends of the axle 7 rearwardly as shown in Fig. 4, provide the wheel with a camber, and incline the pins 36 several degrees from the vertical. Preferably the axes of the pins 36, if extended, should intersect the point of contact of the wheel tire with the ground, so that adjustment of the wheels about the pins 36 involves a minimum of rubbing friction with the traction surface. The brake drum is indicated in Fig. 3 by the reference numeral 38, and the relative positions of this drum in the extreme adjusted positions of the wheels mentioned above and with respect to the axle 7 are indicated in broken lines in Fig. 4.

Referring to Figs. 5, 6 and 7, it will be noted that the teeth of the respective crown wheels 26 and 27, which as previously set forth mesh with the pinion 25, define a curve which in part is concentric with the shafts 28 and 29, to which the said crown wheels are secured, and in part eccentric thereto. These two parts, the concentric and eccentric, contain the same number of teeth, but since the eccentric portion of the curve has much smaller radii along its middle section than the concentric portion, it must necessarily embrace a greater sector of the wheel than the concentric portion. This is clearly shown in Figs. 2, 5 and 7. Under these circumstances, it will be apparent that for a given rotation of the pinion 25, the crown wheel will be turned through a greater angle when the pinion is operating on the eccentric toothed portion of the gear than when it is operating on the concentric portion. Since the crown wheels 26 and 27 are exact opposites and are mounted face to face as shown in Fig. 6, it will be apparent that the pinion 25, except when meshing with the gears directly at the junctions of the concentric and eccentric portions of the tooth curves, as shown in Fig. 5, will necessarily operate simultaneously upon the concentric portion of one gear and the eccentric portion of the other gear, so that for any movement of the pinion 25, the resultant movements of the crown wheels 26 and 27 will differ from each other. As previously set forth, the crown wheels 26 and 27 are connected through the shafts 28 and 29 respectively with the forward wheels 2 and 3 of the vehicle, and the parts are so relatively arranged that when the said forward wheels are in the straight-ahead position or as shown in Fig. 1, both crown wheels occupy the intermediate position illustrated in Fig. 5 relative to the pinion 25. In this relative position, the pinion 25 engages both crown wheels at the junctures of the concentric and eccentric portions of the gears. When under these conditions the pinion 25 is rotated, the resultant angular movements of the wheels 2 and 3 must differ one from the other, this by reason of the fact that the pinion as previously set forth is operating on the concentric portion of one gear and the eccentric portion of the other. It will further be noted that the arrangement is such that if the hand wheel 9, which as previously set forth is operatively connected with the pinion 25, is turned to the left in order to guide the vehicle toward the left, the pinion 25 will immediately come into operative relation with the eccentric portion of the gear 26 and with the concentric portion of the gear 27, and since the gear 26 is connected with the left-hand wheel 2 of the vehicle and the gear 27 with the right-hand wheel 3, it necessarily follows that for any given movement of the hand wheel 9 in this direction, the wheel 2 will be given a greater angular adjustment than the wheel 3. When the wheel 9 is turned to the right for a right-hand turn of the vehicle, the opposite effect takes place, the wheel 3 of the vehicle in this instance receiving a greater angular adjustment than the wheel 2.

It will be noted, of course, that the spiral gears 31, 34, 32 and 35 are of such nature that a counterclockwise movement of the gear 26, see Fig. 5, results in an adjustment of the wheel 2 in the direction guiding the vehicle to the left from the direction of travel, and vice versa, while the simultaneous movement of the gear 27 in the reverse direction results in corresponding adjustments of the wheel 3, but as previously set forth of different magnitude.

Referring to Fig. 1, in turning the vehicle in either direction, (disregarding the camber of the wheels and the effects of the inclination of the pivot pins 36) the ideal steering condition requires that continuations of the mutual axis of the rear or non-steering wheels 4 and 5 and of the individual axes of the forward wheels 2 and 3 shall intersect at a point corresponding to the center for the arc constituting the path of the vehicle. Referring to the device described above and illustrated in Figs. 5, 6 and 7, it is possible to so design the variable pitch-diameter crown wheels in relation to the other parts and to the wheelbase and gage of any vehicle that this ideal steering condition may be maintained for all steering adjustments of the forward wheels within the entire working range of the latter. As previously set forth, my steering mechanism is so designed as to permit an adjustment of the steering wheels through a continuous angle of say 158°. Also in either of the extreme positions of adjustment of the steering wheels that one of the wheels on the side of the vehicle towards which the turn is to be made lies approximately at right angles to the longitudinal axis of the car with its extended axis of rotation, (again assuming an absence of camber and vertically disposed pivot pins) theoretically intersecting the axis of the rear wheels approximately at the center of that one of the rear wheels positioned on the same side of the vehicle. The steering wheel on the other side of the vehicle having been turned through a lesser angle is also in a position wherein its axis of rotation intersects the mutual axis of the rear wheels at the same point, or in other words at the center of the rear wheel on the opposite side of the vehicle. This will be apparent from Fig. 1, wherein the dotted line $a$—$a$ represents the plane of the wheel 3 when it has been adjusted into the extreme position for a right-hand turn. Under these circumstances, the axis of the wheel is pointing directly toward the rear wheel 5 on the same side of the vehicle, and the axis of the wheel 3 will intersect the axis of the wheel 5 approximately at the center of the latter. Simultaneously with the adjustment of the wheel 3 from the normal straightforward position to the position designated $a$—$a$, the wheel 2 at the opposite side of the vehicle has moved from the normal position to a position designated by the broken line $b$—$b$. When in this position, the axis of the wheel 2 points directly to the center of the rear wheel 5 at the opposite side of the vehicle and will intersect the common axis of the rear wheels 4 and 5 at that point. Under these conditions, the center on which the vehicle will turn is the point of contact between the rear wheel 5 and the ground, so that the ideal steering relation set forth above prevails. The same relation will prevail in an adjustment of the steering wheels to the left into the extreme positions designated $c$—$c$ and $d$—$d$, the axes of the wheels 2 and 3 in this instance converging to a point at the center of the rear wheel 4. The crown wheels are so designed that correct steering conditions prevail for any position of adjustment of the steering wheels. As previously set forth, the relations given above disregard the camber of the steering wheels and the inclinations of their pivot pins. Actually, the relation might more accurately but less clearly be defined by stating that the vertical planes containing the axes of the respective steering wheels meet in a line intersecting the common axis of the non-steering wheels approximately at the center of that one of the non-steering wheels on the side of the vehicle toward which the turn is made. Obviously the meeting line of the said planes also intersects the point of contact of the non-steering wheel with the traction surface. As previously stated, the camber and pivotal inclination does not adversely affect the desired relation in an operative sense, and may, therefore, be ignored.

In order to take full advantage of the steering system described above I provide means, operative automatically when the steering wheels are turned either way into the extreme positions, for locking and immobilizing that one of the rear wheels which constitutes the pivotal axis about which the movement of the vehicle is to take place. This automatic locking device is illustrated in Figs. 10 to 17, inclusive. Referring to Figs. 10 and 11, the steering shaft 11, as previously set forth, carries a worm 12 which meshes with a worm wheel 13 in a housing 14 depending from the steering column. The worm wheel 13 has projecting from one face thereof and adjacent the periphery a roller 41, and mounted within the housing 14 at either side of and in the path of movement of the roller 41 when the worm wheel 13 is rotated a predetermined amount is a pair of levers 42 and 43. The lever 42 is attached to a shaft 44 journaled and projecting through a wall of the housing 14. On its outer projecting end, the shaft 44 carries fixed thereto an arm 45. Similarly, the lever 43 is attached to a shaft 46 journaled in and projecting through the wall of the housing and having fixed to its projecting end a depending arm 47. As shown in Figs. 1 and 2, the arm 45 is connected through rods 48 and 49 and a rock shaft 51, journaled in the frame 1, with a lever 52 in the differential housing 53 of the rear axle 8. The arm 47 is similarly connected through rods 54 and 55 and a rock shaft 56, journaled in the frame 1, with a second lever 57 in the differential housing 53. With reference to Fig. 10, it will be noted that each of the levers 42 and 43 is provided with an extension 42$a$ and 43$a$ respectively which by engagement with the housing 14 limits the movement of the lever in one direction. Both levers, however, are free to move under actuation of the roller 41, as indicated in the case of the lever 42, by the broken lines.

With reference to Fig. 12, it will be noted that the housing 53 encases the usual differential mechanism shown in broken lines, which mechanism is operatively associated with the shafts 61 and 62 which are respectively connected to the right and left rear wheels 5 and 4 of the vehicle. As shown, the inner end of each of the shafts 61 and 62, which is operatively connected to the differential mechanism, is provided with splines 63. Suitably mounted within the housing 53 and embracing the splined portion of the shaft 61 is a sub-housing 64. This housing has a projecting portion 65 in which is journaled a rock shaft 66, and to a projecting end of this shaft is secured the lever 52. Secured by pins 67, 67, see Figs. 13 and 14, to the shaft 66 in the interior of the housing 64 is a member 68 having radially projecting spaced arms 69, 71 and 72. Extending through and between the outer ends of these arms is a pin 73 which constitutes a journal for a pair of rollers 74, 74 which are mounted between the intermediate arm 71 and the arms 69 and 72 respectively of the member 68. The rollers 74, 74 engage respectively in yokes 75 on a toothed dog 76, which dog is suspended in the housing from pairs of springs 77, 78, the dog 76 thus being in effect a floating element the position of which may be controlled and regulated through the medium of the member 68, the shaft 66 and the lever 52 connected thereto. The outer end of each of the springs 77 and 78 is secured to an offset portion or crank of a pair of pins 79 and 81, these pins being journaled in the extension 65 of the housing 64 and being adapted to be rotated in order to tension the springs 77 and 78 as required. As shown in Fig. 13, the pin 79 may be secured in adjusted position through the medium of a set screw 82 which is threaded into the housing through a slot 83 in the flanged head of the pin 79. A similar device (not shown) is provided for fine adjustment of the springs 78.

The dog 76 carries a pair of spring-pressed pins 84 and 85 which normally lie flush with those surfaces of the dog 76 engaged by the rollers 74, the function of these detents being set forth hereinafter. It will further be noted that the member 68 carries as a part of the arm 71 thereof a depending projection 86 which cooperates with a pin 87 fixed in the casing 64 to provide a stop limiting the movement of the member 68 in one direction for a purpose hereinafter set forth. A pin 88 threaded into the casing extension 65 also projects into the path of the member 68 and constitutes a stop limiting the movement of this member in the opposite direction.

Splined to the shaft 61 in the interior of the housing 64 is a toothed wheel 91 which in conjunction with the dog 76 constitutes a means for immobilizing the shaft 61, the arrangement being such that movement of the lever 52 acting through the shaft 66, the member 68 and the rollers 74 will advance the dog 76 into interlocking engagement with the wheel 91, thereby preventing rotation of the wheel or of the shaft 61 to which said wheel is secured by means of the splines 63.

Normally, the dog 76 and associated elements occupy the positions in which they are shown in Fig. 13. It should be noted that the dog 76 is restrained from all movement by the combined action of the pairs of springs 77, 78 the rollers 74, 74 the yokes 75, 75, the top surfaces of the dog 76, and especially by the rounded side surface of the depending projection 86 of the member 68, against which surface the dog 76 reclines. Oscillation of the lever 52 in a counterclockwise direction, see Fig. 13, forces the dog towards and into engagement with the wheel 91, it being noted that the teeth of the wheel and of the dog, but especially the middle or guiding tooth of the dog 76, are so formed that proper meshing thereof is assured, regardless of where the toothed wheel 91 may have stopped. If now power is applied to the shaft 61 and 62 through the differential mechanism to propel the vehicle in the forward direction, the resulting movement of the wheel 91 indicated in Figs. 17 and 16 by arrows, carries the dog into the position in which it is shown in Fig. 17, in which complementary surfaces of the dog and of the casing 64, shown at 92, engage to immobilize both the dog and the wheel 91. It will also be noted that in this position the stop 86 of the member 68 lies in engagement with the pin 87. Should the rotation of the wheel 91 be in the opposite direction, it will be apparent that the dog 76 will be carried to the opposite side of the casing in which the complementary surfaces indicated at 93, see Fig. 17, are in engagement. The teeth of the dog 76 are so formed as to lock the wheel 91 against rotation in either direction.

In the course of releasing of the locking mechanism, that is, withdrawing the dog from the locking position shown, for example, in Fig. 17, the lever 52 is moved by spring 52a to the left or in a clockwise direction, see Fig. 13, with the result that the member 68 and the rollers 74 are swung into the position in which they are shown in Fig. 16. At this point, the rollers engage the spring plungers 84 and 85, it being also noted that the rollers 74, 74 have receded in relation to wheel 91 thereby withdrawing the dog 76 by means of the yokes 75, 75 sufficiently, so that the upper teeth of the dog clear the radial surfaces of the teeth of wheel 91, and that the dog 76 has been wedged into a position, shown by the broken lines 76a on Fig. 17, whereby complementary surfaces 92a are brought together. In this last position the spring plungers 84 and 85 yield and permit the dog 76 to back away from the wheel 91 sufficiently to release the latter and to permit rotation thereof under forward driving power from the differential mechanism as shown in Fig. 16. The rotation of the wheel 91 from the said power source is sufficient to cause a backing away of the dog 76 to release the wheel, the formation of the tops of the teeth of the dog 76 being such that rotation of the wheel 91 tends to force the dog away as shown. Further movement of the lever 52 carries the dog to its original position entirely clear of the wheel 91, as shown in Fig. 13. By employing the spring-pressed plungers, a comparatively small movement of the lever 52 results in a release of the dog 76 from locking engagement with the wheel 91.

Locking mechanism identical with that described above is operatively connected with the lever 57, part of this mechanism being indicated in broken lines, and the parts thereof being designated by the same reference numerals as used in connection with the mechanism associated with the lever 52.

As previously set forth, these mechanisms constitute means for automatically locking one or the other of the rear wheels when the steering wheels have been shifted through the steering shaft 11 to predetermined extreme positions. Thus when the steering shaft 11 is operated to carry the steering wheels into the extreme right turn position, the worm wheel 13 is rotated until, when the wheels are approaching the extreme position, the roller 41 engages the lever 42, thereby actuating the arm 45 and, through the connecting rods, the lever 52. As will be apparent from the foregoing description, this adjustment of the lever 52 locks the right rear wheel whereby all the power applied through the differential mechanism is exerted upon the shaft 62 and the left rear wheel whereby the car is turned to the right about the right rear wheel as a pivot. When the turn has been completed, a relatively small movement of the steering shaft 11 results in a release of the shaft 61 by the locking means due to the action of the spring-pressed plungers 84 and 85, which permit the backing away of the dog 76 from the wheel 91 before the lever 52 has moved sufficiently to carry the dog to the normal position shown in Fig. 13. The levers 52 and 57 are actuated in the dog-releasing directions by springs 52a and 57a respectively.

From the foregoing description, it will be apparent that I have provided a simple and efficient device for accurately controlling the steering wheels of a motor vehicle in such manner that for either a right or left-hand turn, the axes of the steering wheels extended intersect approximately at a point on the extended axis of the non-steering wheels, and that I have further provided for adjustment of the steering wheels into extreme positions wherein the point of intersection of the axes thereof is the center of the rear wheel on that side of the vehicle toward which the turn is to be made. Also I have provided means whereby when the wheels are adjusted to either one of these extreme turning positions, that one of the non-steering wheels, the center of which constitutes the intersection of the axes of the steering wheels, is automatically locked against rotation, so that it constitutes a fixed pivot about which the car may be turned by application of power to the other of the non-steering wheels.

I claim:

1. In a steering mechanism for motor vehicles, the combination with the steering wheels, of a steering shaft, and means including a variable pitch-diameter crown wheel for operatively connecting each of said steering wheels with the shaft, said crown wheels being so predeterminedly variable that when the steering wheels are deflected either to right or left the vertical planes respectively containing the axes of the steering wheels are made to meet approximately in a point on the axis of the non-steering wheels.

2. In a steering mechanism for motor vehicles, the combination with the steering wheels, of a steering shaft, a pinion on said shaft, variable pitch-diameter crown wheels engaging opposite sides of said pinion, means for connecting said crown wheels with the respective steering wheels to thereby form an operative connection between said wheels and the shaft, said crown wheels being so predeterminedly variable that when the steering wheels are deflected either to right or left the vertical planes respectively containing the axes of the steering wheels intersect in a line passing through the mutual axis of the non-steering wheels.

3. In a steering mechanism for motor vehicles, the combination with each of the steering wheels, of a rotary shaft, a toothed gear carried by said shaft, a second toothed gear meshing with the gear first named operatively connected with the steering pivot of the associated wheel, a steering shaft, and transmission means connecting said steering shaft with both of the shafts first named, said transmission means including variable pitch-diameter crown wheels secured to the shafts first named and being so predeterminedly variable that when the steering wheels are deflected either to right or left the vertical planes respectively containing the axes of the steering wheels intersect in a line passing through the mutual axis of the non-steering wheels.

4. In a steering mechanism for motor vehicles, the combination with each of the steering wheels, of a rotary shaft, a toothed gear carried by said shaft, a second toothed gear meshing with the gear first named operatively connected with the steering pivot of the associated wheel, a steering shaft, a variable pitch-diameter crown wheel secured to each of the shafts first named, a pinion on said steering shaft and meshing with both of said crown wheels, said crown wheels being so predeterminedly variable that when the said pinion is rotated, they will turn out of unison and that when the steering wheels are deflected either to right or left the vertical planes respectively containing the axes of the steering wheels intersect in a line passing through the mutual axis of the non-steering wheels.

5. In a steering mechanism for motor vehicles, the combination with each of the steering wheels, of a rotary shaft, a spiral gear mounted on said shaft, a second spiral gear operatively connected with the steering pivot of the associated wheel and meshing with the spiral gear first named, a variable pitch-diameter crown wheel secured to each of said shafts, a steering shaft, and a pinion on said steering shaft meshing with both of said crown wheels, said crown wheels being so predeterminedly variable that when the said pinion is rotated, they will turn out of unison and that vertical planes respectively containing the axes of the steering wheels, when the latter are deflected either to right or left, are made to intersect in a line passing through the mutual axis of the non-steering wheels.

6. In a steering mechanism for motor vehicles, the combination with each of the steering wheels, of a rotary shaft, a spiral gear mounted on said shaft, a second spiral gear mounted on the steering pivot of the associated wheel and meshing with the spiral gear first named, the spiral angle of the gear first named being materially greater than the spiral angle of the second spiral gear whereby to obtain a slight degree of irreversibility in the gear train, a crown wheel secured to each of said shafts, a steering shaft, and a pinion on said steering shaft meshing with both of said crown wheels, said crown wheels being so predeterminedly variable that vertical planes respectively containing the axes of the steering wheels are made when the said steering wheels are deflected either to right or left to intersect in a line passing through the mutual axis of the non-steering wheels.

7. In a steering mechanism for motor vehicles, the combination with the steering wheels, of a steering shaft, a pinion on said shaft, variable pitch-diameter face wheels engaging opposite sides of said pinion, each of said face wheels being secured on the inner end of a steering axle the outer end of which carries a spiral gear, a second spiral gear, operatively connected with the steering pivots of the respective steering wheels and respectively meshing with the spiral gears first named, said face wheels being so predeterminedly variable that when the said pinion is rotated, they will turn out of unison and that when the steering wheels are deflected either to right or left the vertical planes respectively containing the axes of the steering wheels intersect in a line passing through the mutual axis of the non-steering wheels.

8. In a steering mechanism for motor vehicles, the combination with each steering pivot, of a spiral gear mounted on the steering axle, and a second spiral gear operatively connected with the steering pivot and meshing with the gear first named, and means including variable pitch-diameter face wheels for rotating the last-named gears into alternative extreme positions including means for effecting therethrough a variable actuation of the steering wheels such that when the latter are deflected either to right or left the vertical planes respectively containing the axes of the steering wheels intersect in a line passing through the mutual axis of the non-steering wheels until in the extreme position of adjustment of said steering wheels said line passes through said mutual axis approximately at the center of the non-steering wheel on that side of the vehicle toward which the steering wheels are adjusted.

9. In a steering mechanism for motor vehicles, the combination with the steering shaft, of means for operatively connecting the shaft with the steering wheels including variable pitch-diameter face wheels, each containing a concentric and an eccentric curved rack with equal numbers of teeth, said face wheels being exact opposites and being mounted face to face, a pinion operatively connected with the steering shaft and in simultaneous engagement with said face wheels, said face wheels turning out of unison when the pinion is rotated, thereby imparting a predetermined differential movement to the steering wheels.

JOHN H. ZESEWITZ.